United States Patent
Winkel et al.

(10) Patent No.: US 9,757,868 B2
(45) Date of Patent: Sep. 12, 2017

(54) POWERED CUTTING TOOL

(71) Applicant: Milwaukee Electric Tool Corporation, Brookfield, WI (US)

(72) Inventors: Steven N. Winkel, Elkhart Lake, WI (US); Troy C. Thorson, Cedarburg, WI (US); Todd M. Gehring, Hartland, WI (US); William W. Strohfeldt, Wauwatosa, WI (US); Matthew Mergener, Germantown, WI (US); Scott Anderson, Racine, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 15/096,338

(22) Filed: Apr. 12, 2016

(65) Prior Publication Data

US 2016/0221200 A1     Aug. 4, 2016

Related U.S. Application Data

(63) Continuation of application No. 13/855,307, filed on Apr. 2, 2013, now Pat. No. 9,339,938, which is a continuation-in-part of application No. PCT/US2011/055465, filed on Oct. 7, 2011.

(60) Provisional application No. 61/621,846, filed on Apr. 9, 2012, provisional application No. 61/391,170, filed on Oct. 8, 2010, provisional application No. 61/431,099, filed on Jan. 10, 2011, provisional application No. 61/474,062, filed on Apr. 11, 2011.

(51) Int. Cl.
*B26B 15/00* (2006.01)
*B23Q 15/007* (2006.01)

(52) U.S. Cl.
CPC ............ *B26B 15/00* (2013.01); *B23Q 15/007* (2013.01)

(58) Field of Classification Search
CPC .............................. B26B 15/00; B23Q 15/007
See application file for complete search history.

(56) References Cited

U.S. PATENT DOCUMENTS

| 364,792 A | 6/1887 | Beecher |
| 1,507,969 A | 9/1924 | Kilgour, Jr. |
| 2,339,880 A | 1/1944 | Romanoff |
| 2,353,922 A | 7/1944 | Neal |
| 2,447,371 A | 8/1948 | Sipsma et al. |
| 2,529,171 A | 11/1950 | Menser |

(Continued)

FOREIGN PATENT DOCUMENTS

| CN | 1527913 | 9/2007 |
| DE | 3424356 | 1/1986 |

(Continued)

OTHER PUBLICATIONS

PCT/US2011/055465 International Search Report and Written Opinion dated May 30, 2012 (12 pages).

*Primary Examiner* — Hwei C Payer
(74) *Attorney, Agent, or Firm* — Michael Best & Friedrich LLP

(57) ABSTRACT

A cutting tool includes a housing and a pair of cutting blades at least partially extending from the housing. At least a first of the cutting blades is movable. The cutting tool also includes a drive mechanism including a cam and a ratchet mechanism. At least a portion of the ratchet mechanism is drivably coupled to the first cutting blade. The cutting tool further includes a motor for providing torque to the cam to actuate the ratchet mechanism. The ratchet mechanism includes a follower that is translatable in a direction transverse to a rotational axis of the cam in response to rotation of the cam.

20 Claims, 11 Drawing Sheets

(56) References Cited

U.S. PATENT DOCUMENTS

| | | | |
|---|---|---|---|
| 2,607,113 A | 8/1952 | James |
| 2,731,721 A | 1/1956 | Traurig |
| 2,911,716 A | 11/1959 | Hopkins |
| 2,985,047 A | 5/1961 | Dort |
| 3,163,072 A | 12/1964 | Person et al. |
| 3,178,816 A | 4/1965 | Schmid |
| 3,243,880 A | 4/1966 | Weller |
| 3,408,875 A | 11/1968 | Briskman et al. |
| 3,536,976 A | 10/1970 | Briskman et al. |
| 3,624,879 A | 12/1971 | Ayer |
| 3,670,855 A | 6/1972 | Lemery |
| 3,693,254 A | 9/1972 | Salonen |
| 3,755,894 A | 9/1973 | Burdick |
| 3,885,309 A | 5/1975 | Lund et al. |
| 3,922,783 A | 12/1975 | Hayes |
| 4,031,619 A | 6/1977 | Gregory |
| 4,050,153 A | 9/1977 | Flisch |
| 4,055,891 A | 11/1977 | Wick |
| 4,143,664 A | 3/1979 | Chorney |
| 4,176,450 A | 12/1979 | Muromoto |
| 4,178,682 A | 12/1979 | Sadauskas |
| 4,186,484 A | 2/1980 | Tanaka |
| 4,277,887 A | 7/1981 | Rady |
| 4,305,205 A | 12/1981 | Girala |
| 4,312,127 A | 1/1982 | Tanaka |
| 4,368,577 A | 1/1983 | Babb |
| 4,378,636 A | 4/1983 | Wick |
| 4,497,227 A | 2/1985 | Stasiek |
| 4,526,076 A | 7/1985 | Hogan |
| 4,674,184 A | 6/1987 | Anderson |
| 4,677,748 A | 7/1987 | Kobayashi |
| 4,769,911 A | 9/1988 | Araki |
| 4,779,342 A | 10/1988 | Kobayashi et al. |
| 4,802,278 A | 2/1989 | Vanderpol et al. |
| 4,819,335 A * | 4/1989 | Alexander ............. B27B 17/14 |
| | | | 30/122 |
| 4,890,385 A | 1/1990 | Vanderpol et al. |
| 4,899,445 A | 2/1990 | Erbrick et al. |
| 4,965,992 A | 10/1990 | Jacobs |
| 5,002,135 A | 3/1991 | Pellenc |
| 5,009,130 A | 4/1991 | Bieganski |
| 5,012,579 A | 5/1991 | Matsumoto |
| 5,018,275 A | 5/1991 | Huang |
| 5,084,975 A | 2/1992 | Melter |
| 5,129,158 A | 7/1992 | Campagna |
| 5,134,776 A | 8/1992 | Moody |
| 5,159,757 A | 11/1992 | Weid et al. |
| 5,184,404 A | 2/1993 | Chen |
| 5,218,765 A | 6/1993 | Huang |
| 5,218,768 A | 6/1993 | Putsch et al. |
| 5,293,019 A | 3/1994 | Lee |
| 5,307,565 A | 5/1994 | Erbrick et al. |
| 5,315,759 A | 5/1994 | Mashata |
| 5,318,081 A | 6/1994 | Parkhurst |
| 5,331,742 A | 7/1994 | Schmode et al. |
| 5,451,127 A | 9/1995 | Chung |
| 5,509,331 A | 4/1996 | Nickipuck |
| 5,511,314 A | 4/1996 | Huang |
| 5,526,570 A | 6/1996 | Beetz et al. |
| 5,537,899 A | 7/1996 | Diedrich |
| 5,590,470 A | 1/1997 | Erbrick et al. |
| 5,596,800 A | 1/1997 | Holliday et al. |
| 5,642,566 A | 7/1997 | Hirabayashi |
| 5,653,027 A | 8/1997 | Wall |
| 5,658,601 A | 8/1997 | Hoshi |
| D386,660 S | 11/1997 | Hirabayashi |
| D388,300 S | 12/1997 | Jeltsch |
| 5,711,739 A | 1/1998 | Hashimoto et al. |
| 5,718,051 A | 2/1998 | Huang |
| 5,761,815 A | 6/1998 | Lin |
| 5,826,341 A | 10/1998 | Massa |
| 5,836,079 A | 11/1998 | Cronin et al. |
| 5,862,552 A | 1/1999 | Koelewyn |
| D405,233 S | 2/1999 | Hirabayashi |
| 5,867,909 A | 2/1999 | Jeltsch et al. |
| 5,901,447 A | 5/1999 | Dunning |
| 5,910,066 A | 6/1999 | Schulz et al. |
| 5,924,201 A | 7/1999 | Wang |
| D413,241 S | 8/1999 | Lai |
| 5,950,315 A | 9/1999 | Linden |
| 5,953,822 A | 9/1999 | Vogelsanger |
| D415,400 S | 10/1999 | Mizutani et al. |
| 5,967,934 A | 10/1999 | Ishida et al. |
| 5,974,670 A | 11/1999 | Hsieh |
| 6,059,083 A | 5/2000 | Tseng |
| 6,094,025 A | 7/2000 | Rosa |
| 6,178,643 B1 | 1/2001 | Erbrick et al. |
| 6,216,347 B1 | 4/2001 | Wada |
| 6,264,211 B1 * | 7/2001 | Granado ............ B23D 57/0076 |
| | | | 173/29 |
| 6,282,990 B1 | 9/2001 | Miner |
| 6,293,019 B1 | 9/2001 | Lee et al. |
| 6,334,255 B1 | 1/2002 | Chang |
| 6,345,444 B1 | 2/2002 | Gillet et al. |
| 6,415,515 B1 | 7/2002 | Wheeler et al. |
| 6,430,815 B1 | 8/2002 | Wickline |
| 6,431,025 B1 | 8/2002 | Koros et al. |
| 6,431,289 B1 | 8/2002 | Potter et al. |
| 6,467,172 B1 | 10/2002 | Jenq |
| 6,481,105 B1 | 11/2002 | Haung |
| 6,594,879 B2 | 7/2003 | Wheeler et al. |
| 6,643,937 B1 | 11/2003 | Wu |
| 6,658,739 B1 | 12/2003 | Huang |
| 6,752,054 B2 | 6/2004 | Knight |
| 6,766,581 B2 | 7/2004 | Nordlin |
| 6,769,183 B2 | 8/2004 | Schmidt |
| 6,796,921 B1 | 9/2004 | Buck et al. |
| 6,829,828 B1 | 12/2004 | Cech et al. |
| 6,892,460 B2 | 5/2005 | Wilhelm et al. |
| 6,893,371 B2 | 5/2005 | Mills et al. |
| 6,938,346 B1 | 9/2005 | Huang |
| 6,971,179 B2 | 12/2005 | Erbrick |
| 7,003,885 B2 | 2/2006 | Daniel et al. |
| 7,013,567 B2 | 3/2006 | Myers |
| 7,021,400 B2 | 4/2006 | Oretti |
| 7,082,968 B2 | 8/2006 | Kurmis |
| 7,116,071 B2 | 10/2006 | Glasgow et al. |
| 7,127,819 B1 | 10/2006 | Huang |
| 7,152,325 B2 | 12/2006 | Green et al. |
| 7,191,525 B2 | 3/2007 | Brailovskiy |
| 7,204,021 B2 | 4/2007 | Houseman et al. |
| 7,293,362 B2 | 11/2007 | Konen |
| 7,328,513 B1 | 2/2008 | Yang |
| 7,346,986 B2 | 3/2008 | Feith |
| 7,346,987 B2 | 3/2008 | Erbrick |
| 7,410,441 B2 | 8/2008 | Milbourne et al. |
| 7,434,497 B2 | 10/2008 | Caravello |
| 7,513,845 B2 | 4/2009 | Ho |
| 7,526,885 B2 | 5/2009 | Peterson et al. |
| 7,716,840 B2 | 5/2010 | Nandkumar et al. |
| 7,743,509 B2 | 6/2010 | Macsay et al. |
| 7,850,145 B2 | 12/2010 | Heravi et al. |
| 7,882,900 B2 | 2/2011 | Borinato et al. |
| 7,886,446 B2 | 2/2011 | Yu Chen |
| D633,765 S | 3/2011 | Nakamura |
| 7,946,039 B2 | 5/2011 | Erbrick |
| D639,628 S | 6/2011 | Zhou et al. |
| 7,966,681 B2 | 6/2011 | Harris |
| 7,984,556 B2 | 7/2011 | Konen |
| 8,024,864 B2 | 9/2011 | Mortensen |
| D657,221 S | 4/2012 | Isobe et al. |
| 8,683,704 B2 | 4/2014 | Scott et al. |
| 9,085,035 B2 | 7/2015 | Wason |
| 9,339,938 B2 * | 5/2016 | Winkel ................ B26B 15/00 |
| 2002/0197123 A1 | 12/2002 | Kopras et al. |
| 2003/0163921 A1 | 9/2003 | Tsai |
| 2004/0040158 A1 | 3/2004 | Stalder |
| 2004/0045174 A1 | 3/2004 | Nordlin |
| 2004/0064954 A1 | 4/2004 | Schmidt |
| 2005/0274237 A1 | 12/2005 | Winkler |
| 2006/0260133 A1 | 11/2006 | Goop |
| 2007/0261252 A1 | 11/2007 | Tu |
| 2008/0161150 A1 | 7/2008 | Hagan et al. |
| 2008/0189954 A1 | 8/2008 | Lin |

(56) References Cited

U.S. PATENT DOCUMENTS

| | | |
|---|---|---|
| 2008/0229584 A1 | 9/2008 | Shepherd |
| 2009/0044343 A1 | 2/2009 | Grave |
| 2009/0071013 A1 | 3/2009 | Hartranft et al. |
| 2009/0293288 A1 | 12/2009 | Hernandez |
| 2009/0313835 A1 | 12/2009 | Erbrick |
| 2010/0064527 A1 | 3/2010 | Lee et al. |
| 2010/0139100 A1 | 6/2010 | Mortensen |
| 2010/0184554 A1 | 7/2010 | Shiohara |
| 2010/0325894 A1 | 12/2010 | Scott et al. |
| 2011/0005083 A1 | 1/2011 | Scott et al. |
| 2011/0219626 A1 | 9/2011 | Broeker et al. |
| 2012/0192440 A1* | 8/2012 | Jerabek ............... B23D 49/165 30/393 |
| 2016/0221200 A1* | 8/2016 | Winkel ............... B23Q 15/007 |

FOREIGN PATENT DOCUMENTS

| | | |
|---|---|---|
| DE | 202004001665 | 6/2004 |
| EP | 2158805 | 3/2010 |
| JP | 03-024067 | 3/1991 |
| JP | 7314239 | 12/1995 |
| JP | 2001225254 | 8/2001 |
| JP | 2004154905 | 6/2004 |
| JP | 2006055914 | 3/2006 |
| JP | 2008142862 | 6/2008 |
| JP | 2009248202 | 10/2009 |
| JP | 2009297858 | 12/2009 |
| JP | 2010046748 | 3/2010 |
| JP | 2010110887 | 5/2010 |
| WO | 2009151059 | 12/2009 |
| WO | 2009151064 | 12/2009 |
| WO | 2009151066 | 12/2009 |
| WO | 2010021251 | 2/2010 |
| WO | 2010021252 | 2/2010 |
| WO | WO 2010/031658 A1 * | 3/2010 |
| WO | 2010041600 | 4/2010 |
| WO | 2010098149 | 9/2010 |
| WO | 2010134431 | 11/2010 |

* cited by examiner

POWERED CUTTING TOOL

CROSS-REFERENCE TO RELATED APPLICATIONS

This application is a continuation of U.S. patent application Ser. No. 13/855,307 filed on Apr. 2, 2013, which claims priority U.S. Provisional Patent Application No. 61/621,846 filed Apr. 9, 2012, and which is a continuation-in-part of International Patent Application No. PCT/US2011/055465 filed Oct. 7, 2011, which claims priority to U.S. Provisional Patent Application Nos. 61/391,170 filed Oct. 8, 2010; 61/431,099 filed Jan. 10, 2011; and 61/474,062 filed Apr. 11, 2011, the entire contents of all of which are incorporated herein by reference.

FIELD OF THE INVENTION

The present invention relates to power tools, and more particularly to battery-powered cutting tools.

BACKGROUND OF THE INVENTION

Non-powered cable-cutting tools typically include opposed cutting blades attached to respective elongated handles. The blades are pivotably attached, such that squeezing the handles together results in progressive closing of the gap between the cutting blades to cut a cable positioned between the blades. Such non-powered cable-cutting tools may be difficult to use with some materials or cable sizes due to insufficient leverage provided by the handles to ensure a complete and straight cut. Such non-powered cable-cutting tools may also be difficult to use for some individuals lacking sufficient wrist strength to generate enough force on the handles to cut a particular size or material of cable.

SUMMARY OF THE INVENTION

The invention provides, in one aspect, a cutting tool including a housing and a pair of cutting blades at least partially extending from the housing. At least a first of the cutting blades is movable. The cutting tool also includes a drive mechanism including a cam and a ratchet mechanism. At least a portion of the ratchet mechanism is drivably coupled to the first cutting blade. The cutting tool further includes a motor for providing torque to the cam to actuate the ratchet mechanism. The ratchet mechanism includes a follower that is translatable in a direction transverse to a rotational axis of the cam in response to rotation of the cam.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
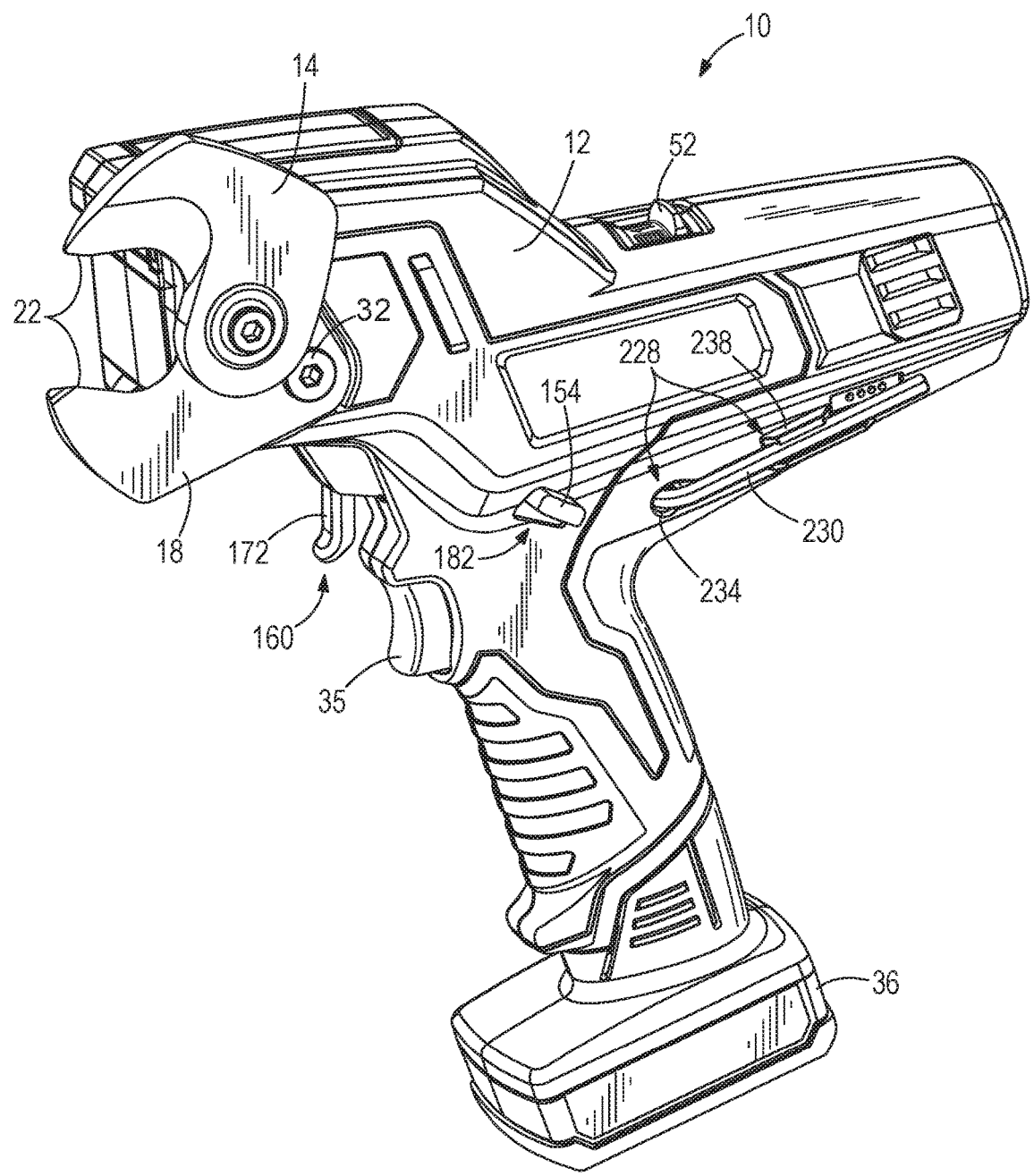
FIG. 1 is a perspective view of a cutting tool according to an embodiment of the invention.

FIG. 1 illustrates a powered cable-cutting tool 10. The tool 10 includes a housing 12 and a pair of cutting blades 14, 18 at least partially extending from the housing 12. In the illustrated embodiment of the tool 10, each of the blades 14, 18 is shaped having a curved cutting edge 22. Alternatively, one or both of the blades 14, 18 may include a straight cutting edge. Furthermore, one or both of the blades 14, 18 may include one or more support portions sized to accommodate different cable diameters of standard sizes. Also, in the illustrated embodiment of the tool 10, the blades 14, 18 are offset with respect to a vertical plane passing through the middle of the housing 12. Alternatively, the position of the blades 14, 18 may coincide with the vertical plane passing through the middle of the housing 12.

Figure 2:
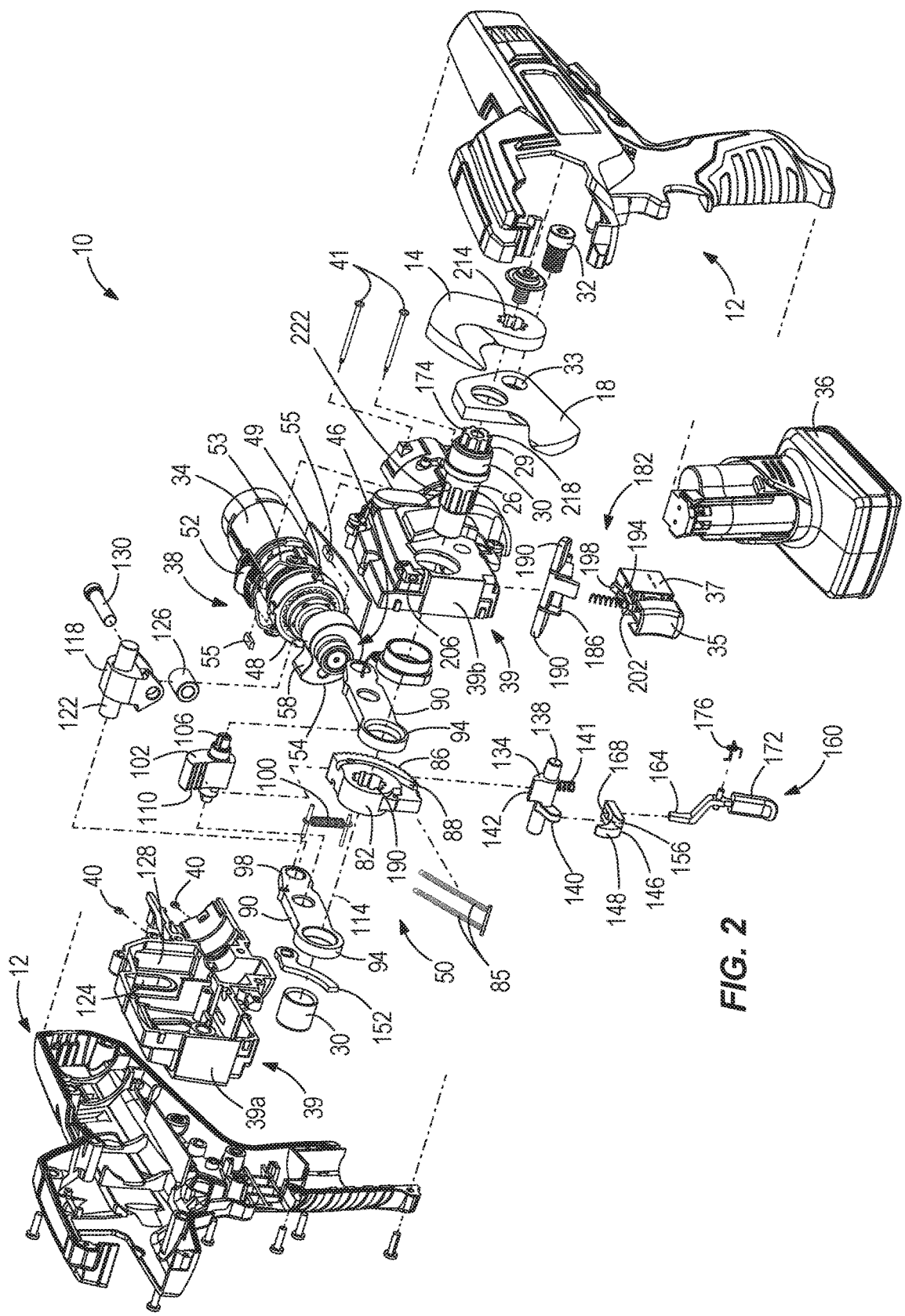
FIG. 2 is an exploded, front perspective view of the cutting tool of FIG. 1.
Figure 9:
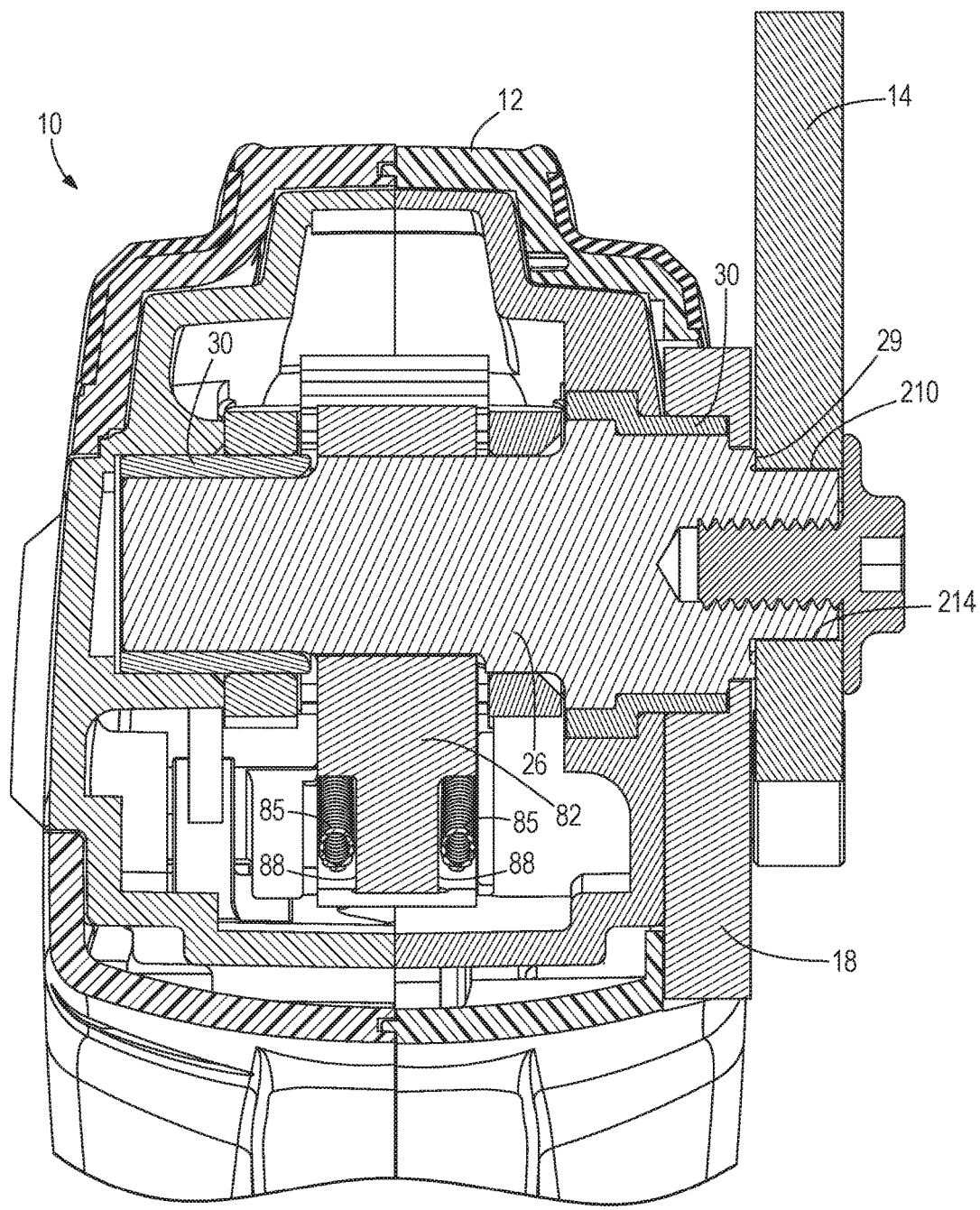
FIG. 9 is a cross-sectional view of the cutting tool taken along line 9-9 in FIG. 8.

With reference to FIG. 2, the cutting blades 14, 18 are pivotably coupled by an output shaft 26 that is rotatably supported within the housing by spaced bushings 30 (see also FIG. 9). In the illustrated embodiment of the tool 10, the lower blade 18 (i.e., from the frame of reference of FIGS. 1 and 2) is fixed to the housing 12 while the upper blade 14 is coupled for co-rotation with the shaft 26. Particularly, the output shaft 26 includes a first spline portion 210 that is received within a corresponding shaped aperture 214 in the upper blade 14. The first spline portion 210 is asymmetrical in that a locating spline 218 on the first spline portion 210 has a width different than that of the remaining splines on the spline portion 210. As such, the upper blade 14 may be fit to the shaft 26 in only a single orientation. During operation of the tool 10, the output shaft 26 is rotated within the housing 12 (i.e., in a clockwise direction from the frame of reference of FIG. 3) to pivot the upper blade 14 relative to the lower blade 18 to thereby close the gap between the blades 14, 18 and perform a cutting operation. Alternatively, both of the blades 14, 18 may be movable relative to the housing 12 when performing a cutting operation.

Figure 8:
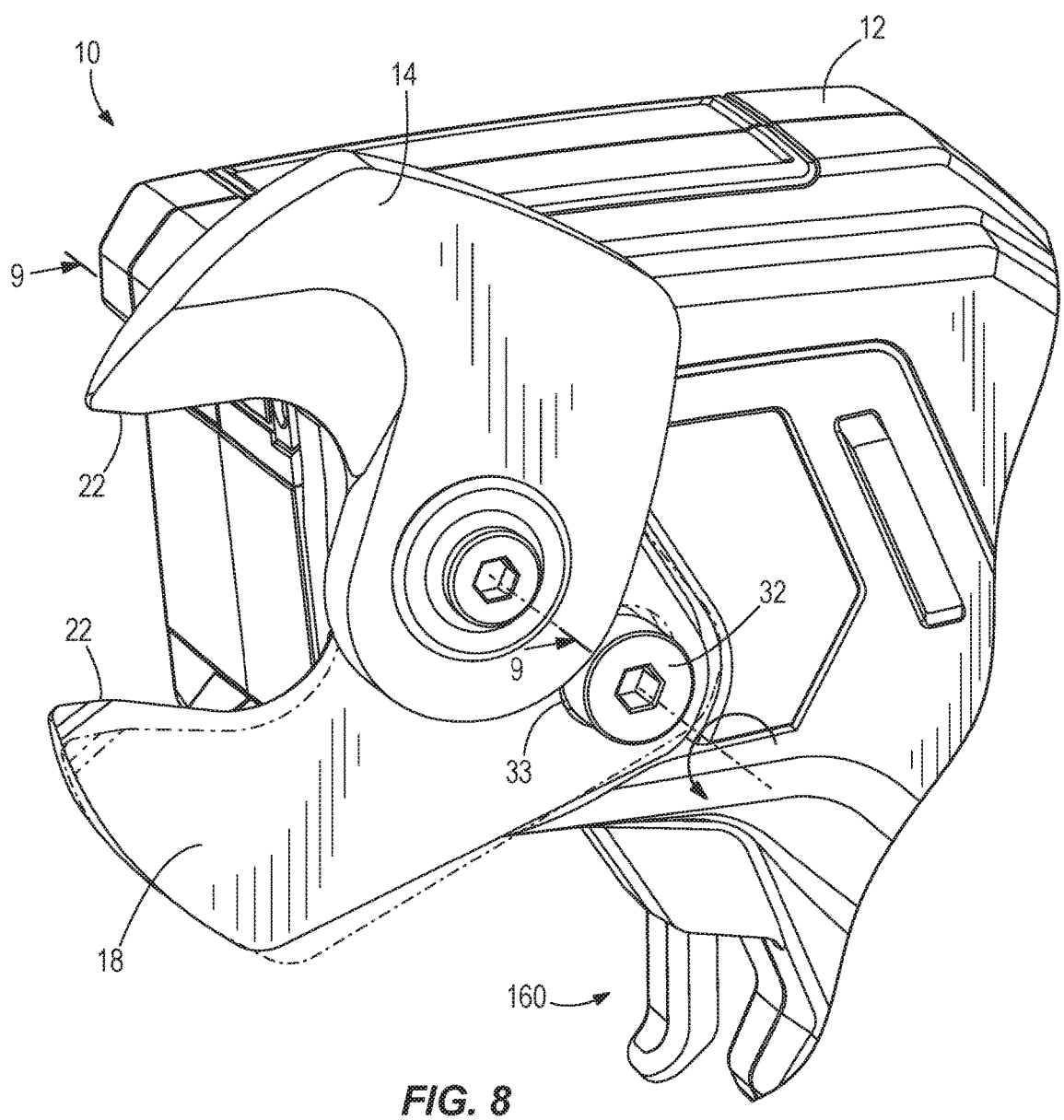
FIG. 8 is an enlarged, front perspective view of the cutting tool of FIG. 1.

With reference to FIG. 2, the lower blade 18 is prevented from pivoting relative to the housing 12 by a securing member (e.g., in the illustrated construction of the tool 10, a cap screw 32) having a head that is received within a stepped aperture 33 in the lower blade 18. The stepped aperture 33 has a diameter nominally larger than a diameter of a head of the cap screw 32. When the head of the cap screw 32 is removed from the aperture 33, the lower blade 18 is permitted to pivot away from the upper blade 14 a limited amount about the output shaft 26 (e.g., 5 degrees; FIG. 8) to clear any jams that might occur between the workpiece and the blades 14, 18. Alternatively, the securing member may be configured in any of a number of different manners (e.g., a tool-less clamp, etc.) to selectively permit the lower blade 18 to be pivoted a limited amount to clear any jams that might occur between the workpiece and the blades 14, 18.

With reference to FIG. 1, the tool 10 also includes an on-board tool storage arrangement 228 for carrying one or more hand tools (e.g., a hex key 230) for loosening and tightening the cap screw 32. Particularly, the arrangement 228 includes a through-hole 234 in the housing 12 in which one segment of the hex key 230 may be received, and a clamp 238 in which the other segment of the hex key 230 is secured. Another hex key 230 may be supported on the other side of the housing 12 not shown in FIG. 1.

With reference to FIG. 9, the output shaft 26 includes a shoulder 29 for maintaining a gap between the blades 14, 18 during operation of the tool 10. For example, such a gap may be between about 0.005 inches and about 0.010 inches in length.

Figure 3:
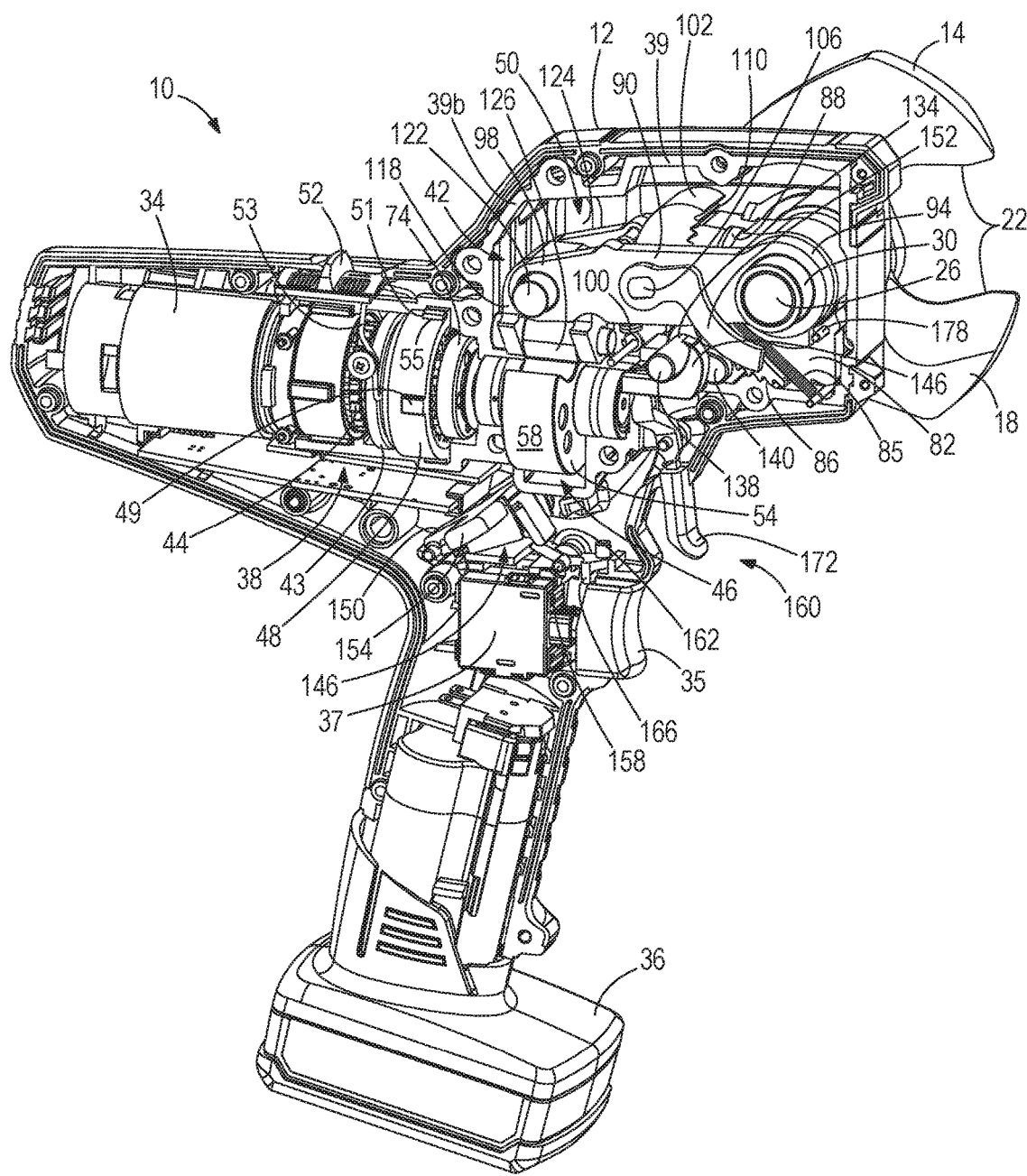
FIG. 3 is a cutaway perspective view of the cutting tool of FIG. 1.

With reference to FIGS. 2 and 3, the tool 10 includes an electric motor 34 positioned within the housing 12. The motor 34 may be powered by an on-board power source (e.g., a battery 36) or a remote power source (e.g., an electrical outlet) via a power cord. The tool 10 also includes a switch 37 selectively electrically connecting the power source and the motor 34. The switch 37 is actuated by a pull trigger 35 which, in turn, is engageable by a user of the tool 10 during the normal course of operation of the tool 10. The tool 10 may also include a controller electrically connected to the switch 37 and the motor 34 to provide varied operation of the motor 34 in response to actuation of the switch 37 (e.g., a variable speed operation, etc.).

With reference to FIGS. 1-3, the tool 10 also includes a trigger lock 182 that must be actuated before the trigger 35 may be pulled to activate the motor 34. The trigger lock 182 includes a first lever 186 that is pivotably coupled to the housing 12 (FIG. 3). The first lever 186 includes opposed projections 190 that extend from opposite sides of the housing 12, respectively, to be accessible to the user of the tool 10 (see also FIG. 1). The trigger lock 182 also includes a second lever 194 that is pivotably coupled to the housing 12 (FIG. 3). The first lever 186 is engageable with a first arm 198 of the second lever 194 to pivot the second lever 194 from a first position, in which a second arm 202 of the lever 194 blocks actuation of the trigger 35, toward a second position, in which the second arm 202 is cleared of the trigger 35. Therefore, in operation of the tool 10, a user must depress one of the projections 190 to pivot the first lever 186 clockwise, from the frame of reference of FIG. 3, to engage and pivot the second lever 194 from the first position to the second position prior to pulling the trigger 35.

With continued reference to FIGS. 2 and 3, the tool 10 further includes a transmission 38 configured to receive torque from the motor 34 and provide an output having an increased torque at a reduced rotational speed compared to the output of the motor 34. In the illustrated embodiment of the tool 10, the transmission 38 includes a transmission housing 39 having respective portions 39a, 39b that are secured in a clamshell arrangement (FIG. 2). Particularly, the transmission housing portion 39a includes a plurality of nuts 40 supported therein, while the other transmission housing portion 39b includes a corresponding plurality of bolts 41 supported therein for threadably engaging the nuts 40 in the portion 39a. The motor 34 is thereby clamped between the transmission housing portions 39a, 39b using the same fasteners 40, 41. The transmission housing portions 39a, 39b are also made of different materials to provide a higher yield strength to the portion 39b to which the fixed lower blade 18 is mounted. Specifically, the transmission housing portion 39b is made from an alloy having an increased Zinc content compared to the alloy used in making the transmission housing portion 39a.

With continued reference to FIG. 2, the tool 10 includes a light 206 (e.g., an LED) on the transmission housing 39 for illuminating the area on a workpiece to be cut. In the illustrated embodiment of the tool 10, the light 206 is positioned adjacent the upper blade 14 on a side of the transmission housing portion 39b facing the blades 14, 18. Alternatively, the light 206 may be positioned elsewhere on the tool 10. In operation of the tool 10, the light 206 is activated in response to the trigger 35 being depressed, and remains on for a period of time after the trigger 35 is released. The light 206 may also be activated separately from the motor 34 by only slightly depressing the trigger 35.

Figure 4:
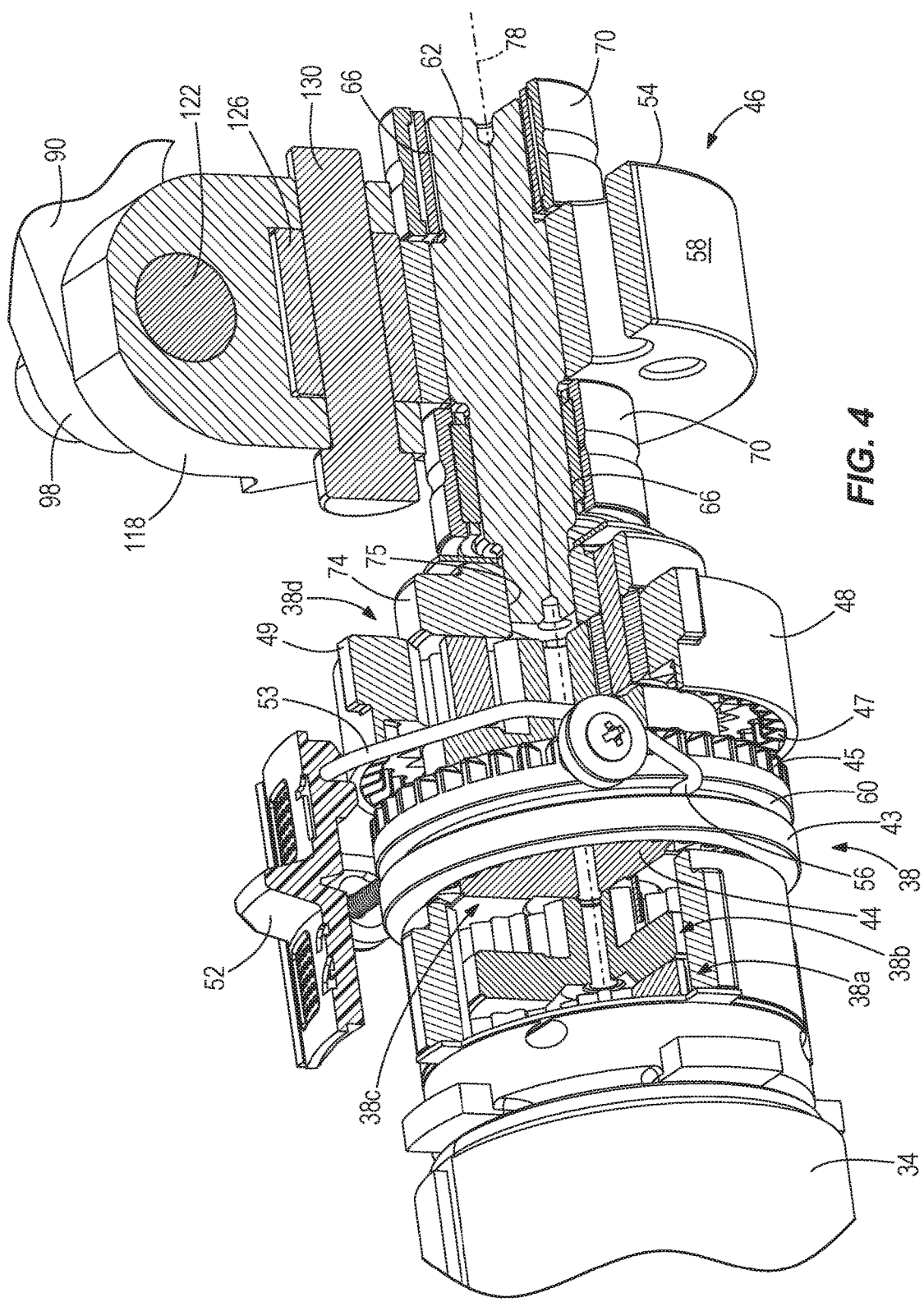
FIG. 4 is a partial cross-sectional view of a multi-speed planetary transmission of the cutting tool of FIG. 1, illustrating the transmission in a high-speed mode.

In the illustrated embodiment of the tool 10, the transmission 38 is configured as a planetary transmission 38 having a plurality of stages, one of which may be deactivated to provide a multi-speed output. For example, the illustrated transmission 38 includes four planetary stages, the first 38a, second 38b, and fourth stages 38d of which remain active at all times, while the third planetary stage 38c may be selectively deactivated by the user of the tool 10 to use the tool 10 in a high speed mode (FIG. 4). The third planetary stage 38c may be deactivated, for example, by adjusting an outer ring gear 43 of the third planetary stage 38c such that it co-rotates with a carrier 44 of the second planetary stage 38b. Consequently, the planet gears and the carrier of the third planetary stage 38c would also co-rotate with the carrier 44 of the second planetary stage 38b, thereby transferring the rotational output of the carrier 44 of the second planetary stage 38b through all of the components of the third planetary stage 38c without any additional speed reduction.

Figure 5:
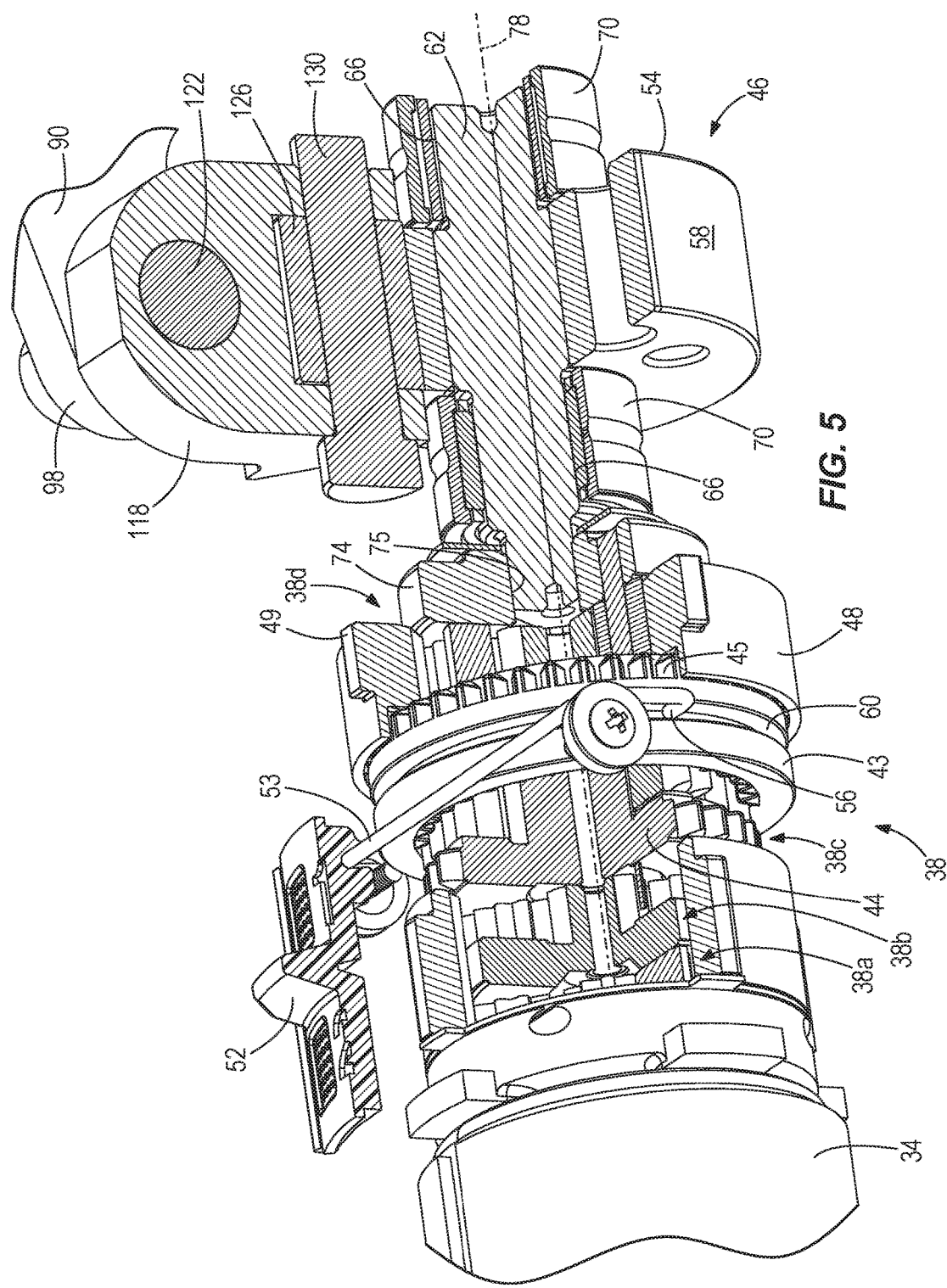
FIG. 5 is a partial cross-sectional view of the multi-speed planetary transmission of FIG. 4, illustrating the transmission in a low-speed mode.

The third planetary stage 38c may be activated by adjusting the outer ring gear 43 of the third planetary stage 38c such that it is fixed relative to the housing 12 (FIG. 5). Particularly, the outer ring gear 43 includes a plurality of teeth 45 that are engaged with corresponding teeth 47 on an internal surface of an outer ring gear 48 of the fourth planetary stage 38d which, in turn, is rotatably fixed to the transmission housing 39 by a plurality of protrusions 49 on the outer periphery of the outer ring gear 48 that are received within corresponding recesses 51 in the transmission housing 39 (FIG. 3). Accordingly, when the outer ring gear 43 is shifted to the position shown in FIG. 5, the planet gears of the third planetary stage 38c may be driven by the carrier 44 of the second planetary stage 38b to "walk" about the inner periphery of the outer ring gear 43, thereby rotating the carrier of the third planetary stage 38c at a reduced rotational speed compared to the carrier of the second planetary stage 38b. The tool 10, therefore, may be used in a low speed mode.

With reference to FIG. 2, rubber bumpers 55 are positioned adjacent the top and bottom protrusions 49 on the outer ring gear 48 of the fourth planetary stage 38d to absorb reverse impact loading to the transmission 38 during operation of the tool 10.

The outer ring gear 43 of the third planetary stage 38c is adjusted or manipulated between the configurations described above by an actuator 52 that at least partially protrudes through the housing 12. In the illustrated embodiment of the tool 10, the actuator 52 is configured as a slide switch 52 that is movable between a first position, in which the third planetary stage 38c is active for providing a low speed mode of the tool 10, and a second position, in which the third planetary stage 38c is inactive to provide a high speed mode of the tool 10. A pivoting wire 53 is positioned between the slide switch 52 and the outer ring gear 43 for transferring the linear movement of the slide switch 52 to the outer ring gear 43 between the above-described positions for providing the high speed and low speed modes of the tool 10. Particularly, opposite ends 56 of the wire 53 slide within a circumferential groove 60 in the outer ring gear 43, thereby facilitating linear movement of the outer ring gear 43 while permitting rotation of the outer ring gear 43 in the high speed mode of the tool 10.

With reference to FIGS. 2 and 3, the tool 10 also includes a drive mechanism 42 including a cam 46 and a ratchet mechanism 50 drivably coupling the transmission 38 and the upper blade 14. As shown in FIG. 2, the cam 46 includes a lobe 54 having a cam surface 58 and a shaft 62 fixed for co-rotation with the lobe 54 (using, for example, an interference fit, by integrally forming or molding, etc.; FIGS. 4 and 5). Opposite ends 66 of the shaft 62 are rotatably supported by the transmission housing 39 by respective bushings 70. One end 66 of the shaft 62 includes a non-circular cross-sectional shape, and an output carrier 74 of the fourth planetary stage 38d includes an aperture 75 having a corresponding shape in which the end 66 of the shaft 62 is received. As such, a driving connection is established between the shaft 62 and the transmission 38. The cam surface 58 is spaced from a rotational axis 78 of the shaft 62 by a varying distance to impart translation to a portion of the ratchet mechanism 50, in a direction substantially normal to the direction of the rotational axis 78, in response to rotation of the cam 46. It should be understood that the cam 46 may be configured differently than that shown in the drawings. For example, the cam 46 may be configured as an eccentric pin on a rotating arm (e.g., for use with a scotch-yoke mechanism).

With reference to FIGS. 2 and 3, the ratchet mechanism 50 includes a ratchet 82 drivably coupled to the upper blade 14 via the output shaft 26. Particularly, the output shaft 26 includes a second spline portion 222 that is received within a corresponding shaped aperture 226 in the ratchet 82. The second spline portion 222 is asymmetrical in that a locating spline (not shown) on the second spline portion 222 has a width different than that of the remaining splines on the spline portion 222. As such, the ratchet 82 may be fit to the shaft 26 in only a single orientation. As such, the ratchet 82 is coupled for co-rotation with the upper blade 14 and the output shaft 26. The ratchet 82 is substantially arc-shaped and includes teeth 86. The ratchet 82 also includes respective grooves 88 in opposite faces of the ratchet 82 in which corresponding tension springs 85 are received (FIG. 2). One end of each spring 85 is anchored to the transmission housing 39, while the other end of each spring 85 is fixed to the ratchet 82. As such, the springs 85 bias the ratchet 82 in a clockwise direction from the frame of reference of FIGS. 6 and 7. The ratchet mechanism 50 also includes parallel links 90, each of which includes a first end 94 pivotably coupled to the output shaft 26 and a second end 98 that is movable in response to rotation of the cam 46. A tension spring 100 couples the links 90 and the transmission housing 39 for biasing the links 90 toward a default or "home" position shown in FIG. 3.

The ratchet mechanism 50 further includes a first, driven pawl 102 coupled to each of the links 90 between the first and second ends 94, 98 (FIG. 2). More particularly, the pawl 102 includes a support shaft 106 extending from each side of the pawl 102 that is received within respective apertures in the links 90. As such, the pawl 102 is pivotably coupled to the links 90. As is discussed in more detail below, the pawl 102 is pivoted between a first position, in which the pawl 102 is engaged with the ratchet 82, and a second position, in which the pawl 102 is disengaged from the ratchet 82.

Figure 6:
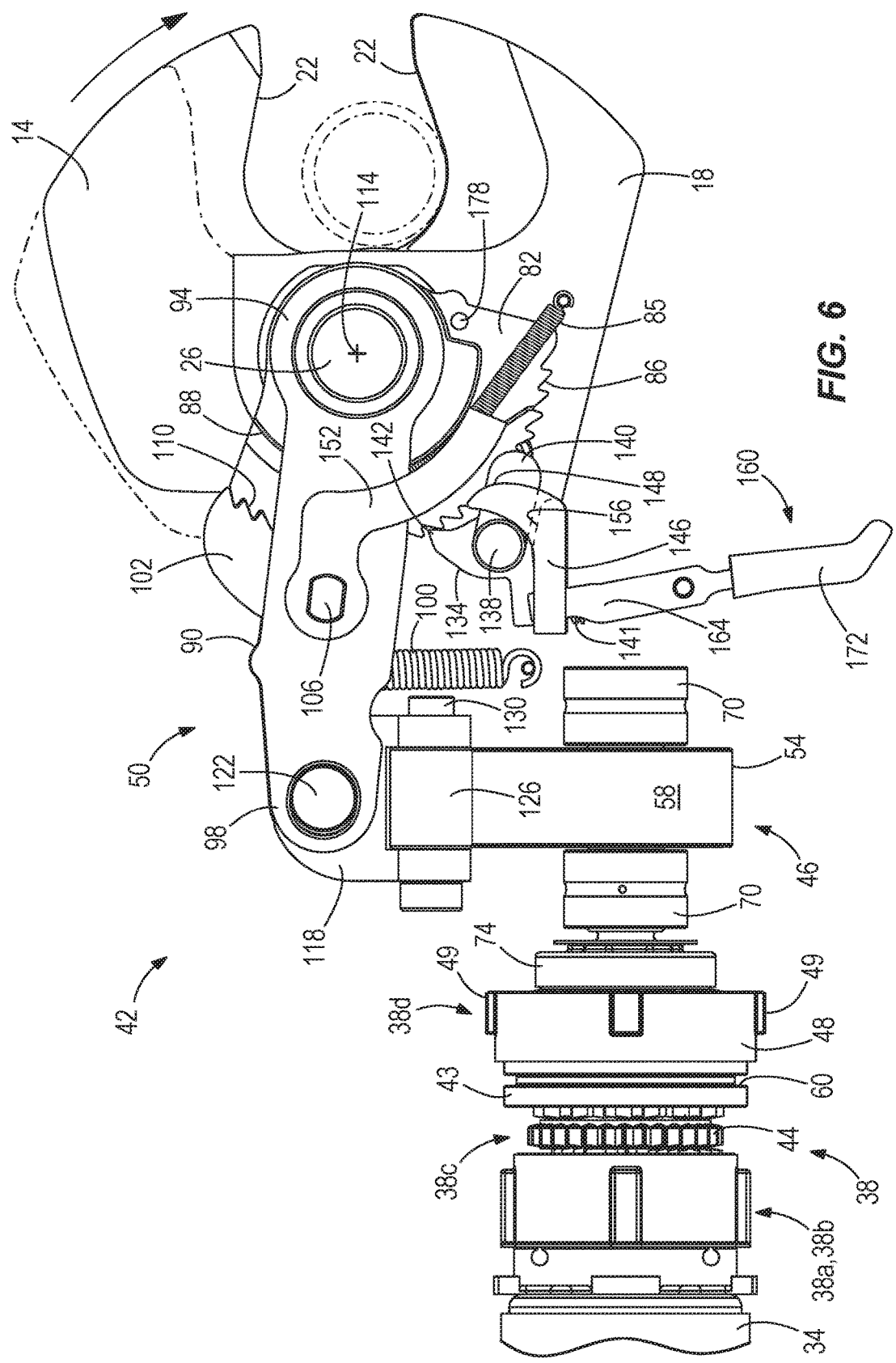
FIG. 6 is a side view of a cam and a ratchet mechanism of the cutting tool of FIG. 1, illustrating the ratchet mechanism incrementally closing the blades of the cutting tool.

The pawl 102 also includes teeth 110 that are selectively engaged with the teeth 86 on the ratchet 82. With reference to FIG. 6, the teeth 86, 110 on the respective ratchet 82 and pawl 102 are shaped such that, in response to rotation of the pawl 102 and the links 90 about the output shaft 26 in a clockwise direction from the frame of reference of FIG. 6, the pawl 102 is prevented from sliding relative to the ratchet 82. The engaged ratchet 82 and pawl 102, therefore, co-rotate about a rotational axis 114 of the output shaft 26. However, the pawl 102 is permitted to slide relative to the ratchet 82 in response to rotation of the pawl 102 and the links 90 about the output shaft 26 in a counter-clockwise direction from the frame of reference of FIG. 6.

With reference to FIGS. 2 and 3, the ratchet mechanism 50 further includes a follower 118 pivotably coupled to the second end 98 of each of the links 90 and engaged with the cam 46. A pin 122 is received within respective apertures in the links 90 and the follower 118 to pivotably couple the links 90 and the follower 118. Opposite ends of the pin 122 are trapped within respective slots 124 in the transmission housing 39 (FIG. 2) configured to permit only vertical movement of the pin 122 within the slots 124 (i.e., relative to the frame of reference of FIG. 6). In other words, the pin 122, and therefore the ends 98 of the respective links 90, is prevented from translating relative to the transmission housing 39 in any other direction.

In the illustrated embodiment of the tool 10, the follower 118 includes a roller 126 engaged with the cam 46 (FIG. 2). The roller 126 is rotatably supported by a pin 130, which includes opposite ends trapped within respective slots 128 in the transmission housing 39 (FIG. 2) configured to permit only vertical movement of the pin 130 within the slots 128 (i.e., relative to the frame of reference of FIG. 6). In other words, the pin 130, and therefore the follower 118, is prevented from translating relative to the transmission housing 39 in any other direction.

With reference to FIG. 2, the ratchet mechanism 50 also includes a second, follower pawl 134 pivotably coupled to the transmission housing 39 and engaged with the ratchet 82. More particularly, the pawl 134 is supported on a support shaft 138 having opposite ends of which that are pivotably supported by the transmission housing 39. An arm 140 is also coupled to the support shaft 138 for co-rotation with the support shaft 138 and the pawl 134. In the illustrated embodiment of the tool 10, the pawl 134, the support shaft 138, and the arm 140 are integrally formed as a single piece. The tool 10 also includes a biasing member (e.g., a compression spring 141) that biases the pawl 134 in a clockwise direction from the frame of reference of FIGS. 6 and 7 for engaging the pawl 134 and the ratchet 82. As is discussed in more detail below, the follower pawl 134 is pivoted between a first, biased position, in which a tip 142 of the pawl 134 is engaged with the ratchet 82, and a second position against the bias of the spring 141, in which the pawl 134 is disengaged from the ratchet 82.

Figure 7:
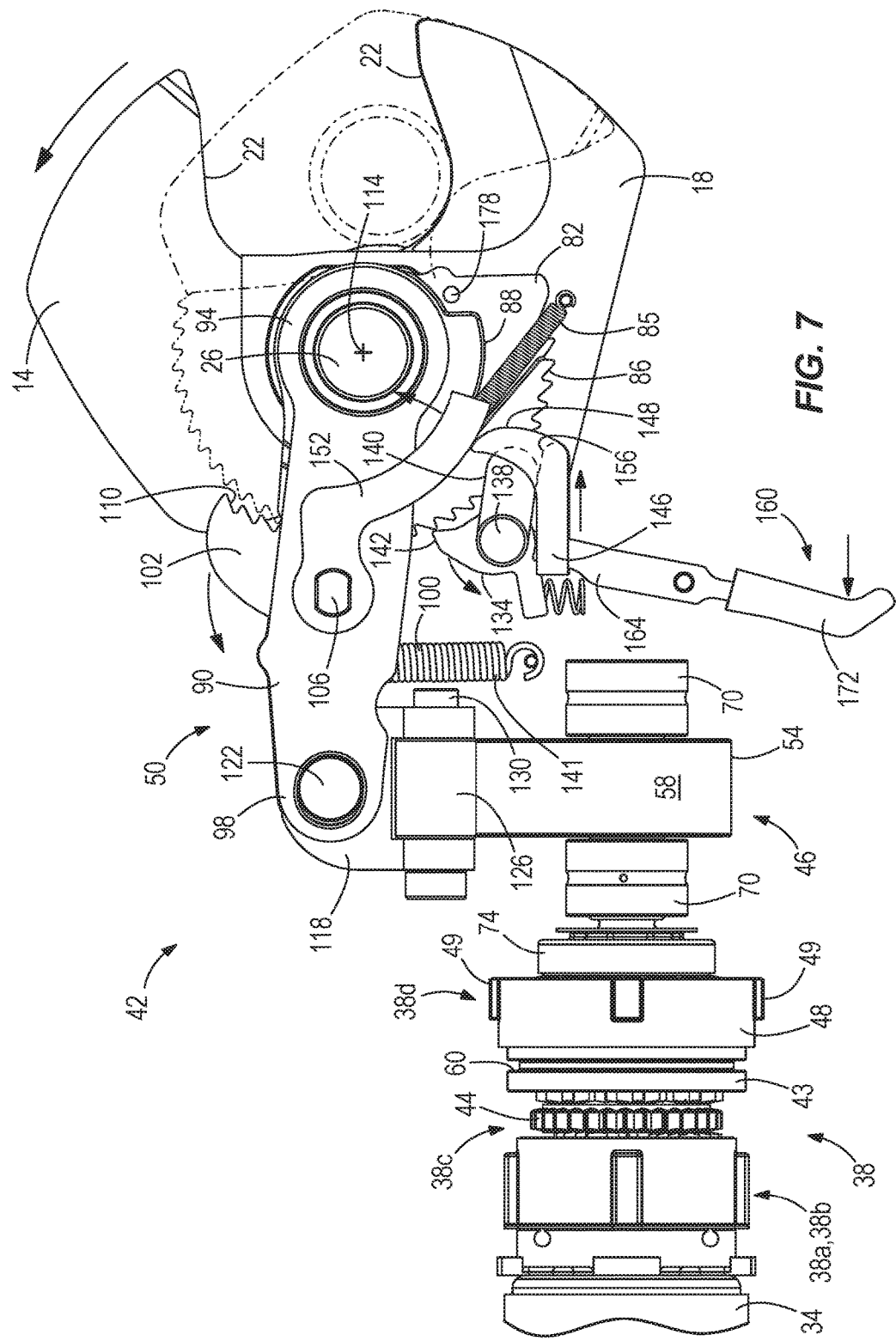
FIG. 7 is a side view of the cam and ratchet mechanism of FIG. 6, illustrating the ratchet mechanism being released to open the blades of the cutting tool.

With reference to FIG. 2, the tool 10 includes an actuator 146 coupled to both of the pawls 102, 134. More particularly, the actuator 146 includes a first cam lobe 148 engageable with the driven pawl 102 via a lever 152 coupled for co-rotation with one of the support shafts 106 (e.g., via an interference fit with a portion of the support shaft 106), and a second cam lobe 156 engageable with the follower pawl 134 via the arm 140 on the support shaft 138. The actuator 146 is biased toward the left from the frame of reference of FIG. 6 by the compression spring 141 via the interaction between the second cam lobe 156 and the arm 140. The actuator 146, therefore, would be movable (i.e., forward or to the right from the frame of reference of FIG. 6) between a first position against the bias of the spring 141 in which the driven and follower pawls 102, 134 are permitted to engage the ratchet 82 (FIG. 6), and a second position in which the actuator 146 disengages the driven and follower pawls 102, 134 from the ratchet 82 (FIG. 7). When moving the actuator 146 from the first position to the second position, the driven and follower pawls 102, 134 would be pivoted in a counter-clockwise direction from the frame of reference of FIG. 7 to disengage the respective pawls 102, 134 from the ratchet 82 to permit the gap between the blades 14, 18 to be re-opened in preparation for another cutting operation.

In the illustrated embodiment of the tool 10, a trigger 160 is pivotably coupled to the transmission housing 39 and includes a branch portion 164 that is received within a corresponding slot 168 in the actuator 146 and a trigger portion 172 that is engageable by a user of the tool 10. The tool 10 also includes a biasing member (e.g., a torsion spring 176) that biases the trigger 160 in a counter-clockwise direction from the frame of reference of FIG. 7 to permit the compression spring 141, via the pawl 134 and arm 140, to return the actuator 146 to its "home" position shown in FIG. 6. The trigger 160 may then be pivoted in a clockwise direction from the frame of reference of FIG. 7 to engage the actuator 146 and move the actuator 146 toward its second position. Alternatively, the actuator 146 may be moved between its first and second positions using any of a number of different mechanisms that protrude from the housing 12 to be easily accessible to the user of the tool 10.

To perform a cutting operation with the tool 10, the user would first place a cable or other workpiece within the gap between the blades 14, 18 (FIG. 6). The switch 37 is then actuated (e.g., by pulling the trigger 35, etc.) to activate the motor 34 which, in turn, drives the transmission 38 and the cam 46. As the cam 46 is rotated in a counter-clockwise direction from the frame of reference of FIG. 2, the roller 126 rides along the cam surface 58 and is displaced upwardly with the follower 118 as the location of maximum lift is approached. Because the links 90 are pivotably supported on the output shaft 26 (which is pivotably supported by the transmission housing 39), the links 90 and the driven pawl 102 are pivoted away from their home position in a clockwise direction from the frame of reference of FIG. 6 about the axis 114 of the output shaft 26, thereby causing the driven pawl 102 (which is engaged with the ratchet 82) to incrementally rotate the ratchet 82, the output shaft 26, and the upper blade 14 about the axis 114 of the output shaft 26. The shape of the teeth 86 on the ratchet 82 also permits the ratchet 82 to slide relative to the follower pawl 134, with the tip 142 of the pawl 134 being successively moved between adjacent teeth 86, as the ratchet 82 is driven in a clockwise direction about the axis 114 of the output shaft 26. Therefore, the follower pawl 134 locks the upper blade 14 in successive positions relative to the lower blade 18 coinciding with the spacing between adjacent teeth 86 on the ratchet 82, and prevents the upper blade 14 from rotating relative to the lower blade 18 in a counter-clockwise direction.

After the follower 118 passes over the location of maximum lift on the cam 46, the links 90 and the driven pawl 102 are permitted to rotate in a counter-clockwise direction from the frame of reference of FIG. 6 about the axis 114 of the output shaft 26, toward the home position of the links 90, while the follower pawl 134 maintains the upper blade 14 in position relative to the lower blade 18. As previously discussed, the shape of the teeth 86, 110 on the respective ratchet 82 and driven pawl 102 permit the driven pawl 102 to slide relative to the ratchet 82 as the links 90 return to their home position. Continued rotation of the cam 46 again causes the follower 118 to be upwardly displaced as the location of maximum lift is approached, thereby causing the driven pawl 102 to incrementally rotate the ratchet 82, the output shaft 26, and the upper blade 14 in a clockwise direction to further close the gap between the blades 14, 18. This process is continued until the gap is sufficiently closed to complete the cutting operation on the cable or other workpiece.

The ratchet 82 includes an aperture in which a stop member (e.g., a pin 178; FIG. 3) is received that is engageable with at least one of the parallel links 90 to limit the extent to which the ratchet 82, and therefore the upper blade 14, may be pivoted relative to the housing 12 in a clockwise direction from the frame of reference of FIG. 6. Alternatively, the stop member may be configured in any of a number of different manners.

After the cutting operation is complete, the user may depress the trigger 160 to slide the actuator 146 toward its second position shown in FIG. 7 to pivot both the driven pawl 102 and the follower pawl 134 in a counter-clockwise direction from the frame of reference of FIG. 7 to disengage the ratchet 82. The ratchet 82, the output shaft 26, and the upper blade 14 may then be pivoted counter-clockwise (e.g., by the return springs 85) to re-open the gap between the blades 14, 18 in preparation for another cutting operation. The user may then release the trigger 160 to permit the actuator 146 to be returned to the first position shown in FIG. 6 by the compression spring 141 (via the interaction with the arm 140) to permit the driven and follower pawls 102, 134 to re-engage the ratchet 82. Because the trigger 160 is positioned proximate the trigger 35, the user of the tool 10 may use their same hand for pulling the trigger 160 as that used when pulling the trigger 35.

Figure 10:
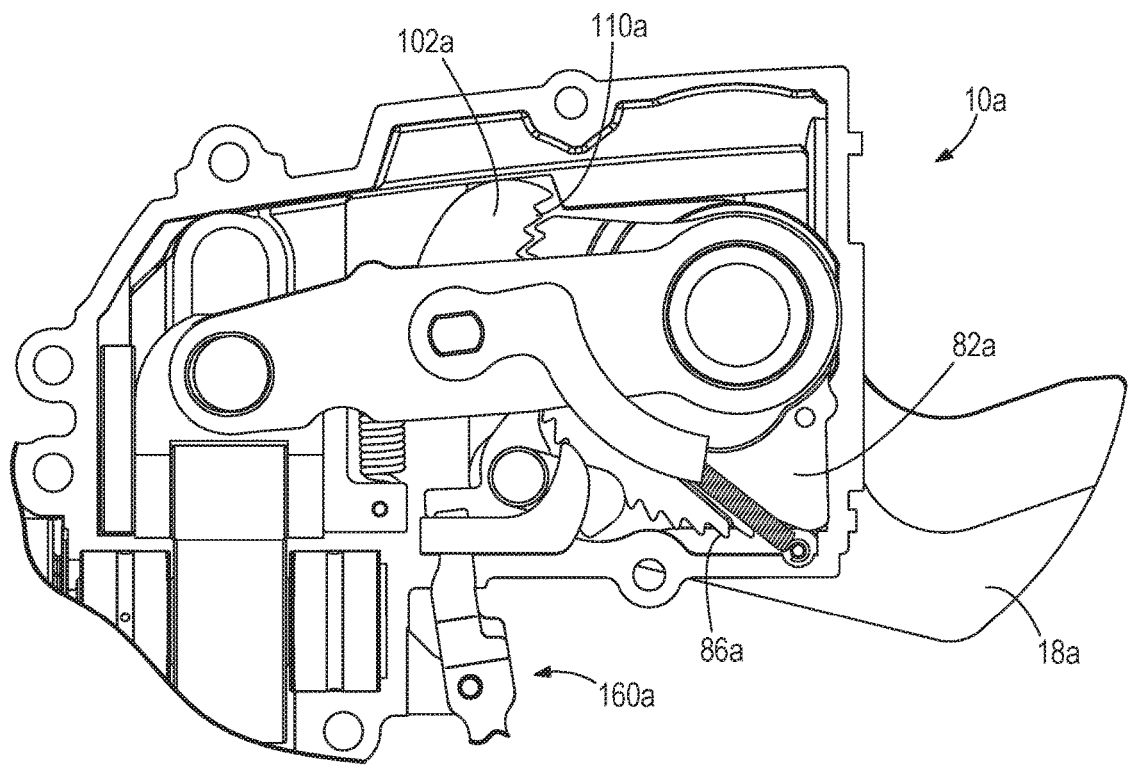
FIG. 10 is a side view of a cutting tool according to another embodiment of the invention, illustrating a cam and a ratchet mechanism.
Figure 11:
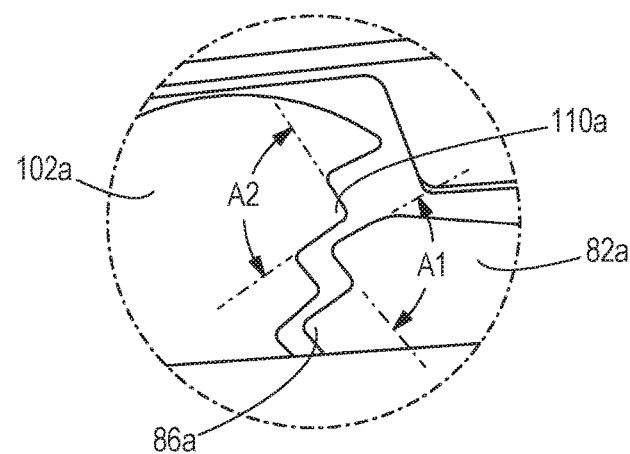
FIG. 11 is an enlarged view of a portion of the ratchet mechanism shown in FIG. 10.

FIG. 10 illustrates a tool 10a in accordance with another embodiment of the invention. As such, like features are shown with like reference numerals with the letter "a." The ratchet teeth 86a and the pawl teeth 110a, however, are each defined by adjacent first and second edges or surfaces defining included angles A1, A2 therebetween of at least about 75 degrees (see also FIG. 11). Particularly, the included angle A1 between the first and second surfaces of each of the ratchet teeth 86a is at least about 85 degrees, and the included angle A2 between the first and second surfaces of each of the pawl teeth 110a is at least about 90 degrees. The respective shapes of the ratchet teeth 86a and the pawl teeth 110a facilitate pivoting of the pawl 102a away from the ratchet 82a when a reaction torque is applied to the ratchet 82a during use of the tool 10a that inhibits further closing of the cutting blades 14a, 18a and that might otherwise tend to bind the pawl 102a to the ratchet 82a in absence of teeth 86a, 110a being shaped in the above-described manner. Such a reaction torque may develop or be applied to the ratchet 82a in response to the blades 14a, 18a seizing while closing on a material not approved for use with the tool 10a (e.g., a steel rod). Because the included angles A1, A2 of the teeth 86a, 110a are sized in the manner described above, the pawl 102a may be pivoted away from the ratchet 82a in response to actuation of the trigger 160a without substantial binding between the ratchet teeth 86a and the pawl teeth 110a. The movable blade 14a may then be pivoted to an open position to remove the unapproved material from the blades 14a, 18a.

The tool 10 may also include electronics for alleviating binding between the ratchet 82 and the pawl 102 that might occur in response to the blades 14, 18 seizing while closing on a material not approved for use with the tool 10. As such, the user may actuate the trigger 160 without much effort to pivot the pawl 102 away from the ratchet 82 and release the movable blade 14 from the remainder of the ratchet mechanism 50 to re-open the blade 14 and remove the unapproved material from the blades 14, 18. Although not described in detail, the tool 10a may also include similar electronics.

Figure 12:
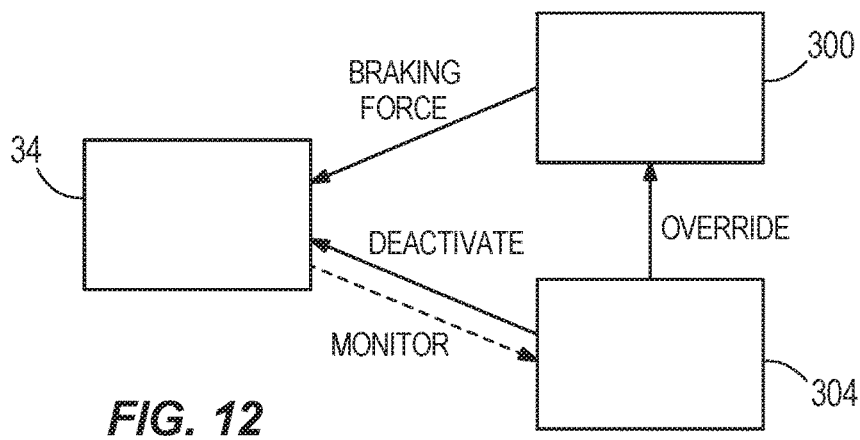
FIG. 12 is a schematic illustrating an electronic braking circuit and a current overload circuit for use in either of the embodiments of the cutting tool shown in FIGS. 1 and 10.

For example, as shown in FIG. 12, the tool 10 may include an electronic braking circuit 300 for normally providing a braking force to the motor 34 in response to deactivation of the motor 34, and a current overload detection circuit 304 for monitoring an amount of electrical current drawn by the motor 34 when the motor 34 is activated. The current overload detection circuit 304 may both deactivate the motor 34 and override the electronic braking circuit 300 in response to the motor 34 exceeding a threshold electrical current to prevent application of the braking force to the motor 34. Therefore, because the motor 34 is freely rotatable subsequently to being deactivated, the motor 34 may be temporarily and briefly rotated in a reverse direction by a torque directed through the transmission 38 and the cam 46, and generated by sliding and/or rolling contact between the follower 118 and the cam 46 as a result of the tension spring 100 exerting a linear return force on the links 90. As such, the user may actuate the trigger 160 without much effort to pivot the pawl 102 away from the ratchet 82 and release the movable blade 14 from the remainder of the ratchet mechanism 50 to re-open the blade 14 and remove the unapproved material from the blades 14, 18.

Figure 13:
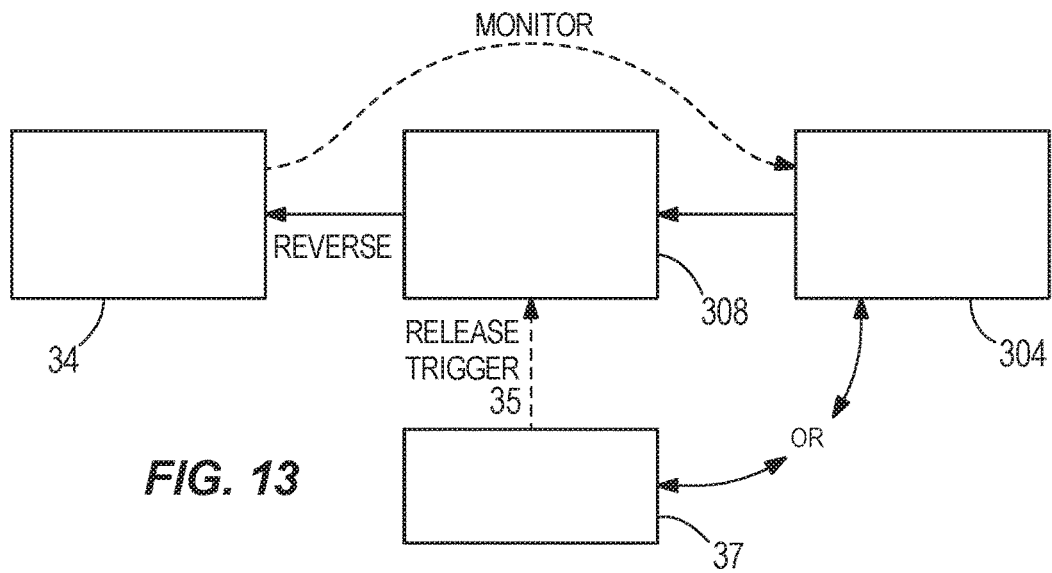
FIG. 13 is a schematic illustrating a reversing circuit and a current overload circuit for use in either of the embodiments of the cutting tool shown in FIGS. 1 and 10.

Alternatively, as shown in FIG. 13, the tool 10 may include a reversing circuit 308 for temporarily and briefly reversing a rotational direction of the motor 34 in response to at least one of the motor 34 exceeding a threshold electrical current (i.e., as detected by a current overload detection circuit 304 such as that described above) and actuation of the switch 37 coinciding with the user releasing the trigger 35. As the motor 34 is reversed, the transmission 38 and the cam 46 are also reversed, thereby enabling the tension spring 100 to pivot the links 90 toward their home position (FIG. 7) and relieve pressure or binding between the ratchet 82 and the pawl 102 prior to disengaging the pawl 102 from the ratchet 82. Thereafter, the user may actuate the trigger 160 without much effort to pivot the pawl 102 away from the ratchet 82 and release the movable blade 14 from the remainder of the ratchet mechanism 50 to re-open the blade 14 and remove the unapproved material from the blades 14, 18.

Figure 14:
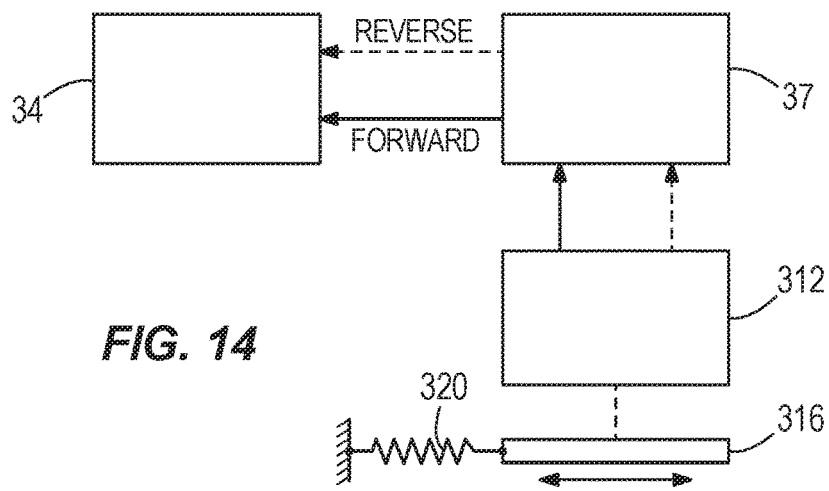
FIG. 14 is a schematic illustrating a direction switch and a shuttle for use in either of the embodiments of the cutting tool shown in FIGS. 1 and 10.

As a further alternative, as shown in FIG. 14, the tool 10 may include a direction switch 312 that is electrically connected with the motor 34 and the switch 37. The direction switch 312 may be actuated between a first position in which the motor 34 and the cam 46 are driven in a forward direction to actuate the ratchet mechanism 50 and incrementally close the blades 14, 18 during a cutting operation, and a second position in which the motor 34 and the cam 46 are driven in a reverse direction. The tool 10 may include a shuttle 316, similar to the actuator 52 shown in FIG. 1, for toggling the direction switch 312 between the first and second positions. Particularly, the shuttle 316 and/or direction switch 312 may be biased toward the first position (e.g., by a spring 320) such that the user must continuously depress the shuttle 316 to maintain the direction switch 312 in the second position, while depressing the trigger 35, in order to operate the motor 34 in a reverse direction. As the motor 34 and the cam 46 are reversed, the tension spring 100 pivots the links 90 toward their home position (FIG. 7) and relieves pressure or binding between the ratchet 82 and the pawl 102 prior to disengaging the pawl 102 from the ratchet 82. Thereafter, the user may actuate the trigger 160 without much effort to pivot the pawl 102 away from the ratchet 82 and release the movable blade 14 from the remainder of the ratchet mechanism 50 to re-open the blade 14 and remove the unapproved material from the blades 14, 18.

Various features of the invention are set forth in the following claims.

What is claimed is:

1. A cutting tool comprising:
   a housing;
   a pair of cutting blades at least partially extending from the housing, at least a first of the cutting blades is movable;
   a drive mechanism including a cam and a ratchet mechanism, at least a portion of the ratchet mechanism is drivably coupled to the first cutting blade;
   a motor for providing torque to the cam to actuate the ratchet mechanism; and
   a planetary transmission between the motor and the cam, the transmission including a carrier directly connected to the cam,
   wherein the ratchet mechanism includes a follower that is translatable in a direction transverse to a rotational axis of the cam in response to rotation of the cam.

2. The cutting tool of claim 1, wherein a second of the cutting blades is fixed relative to the housing.

3. The cutting tool of claim 1, further comprising an output shaft rotatably supported within the housing, wherein the first cutting blade is coupled for co-rotation with the output shaft, and wherein a second of the cutting blades is pivotably supported by the output shaft.

4. The cutting tool of claim 3, further comprising a securing member that is movable between a first position, in which the second cutting blade is secured relative to the housing, and a second position, in which limited pivoting movement of the second cutting blade about the output shaft is permitted.

5. The cutting tool of claim 3, wherein the output shaft includes a shoulder for maintaining a gap between the cutting blades.

6. The cutting tool of claim 1, further comprising an output shaft rotatably supported within the housing, wherein the first cutting blade is coupled for co-rotation with the output shaft, and wherein the ratchet mechanism includes
- a ratchet coupled for co-rotation with the first cutting blade,
- a link having a first end pivotably coupled to the output shaft and a second end that is movable in response to rotation of the cam, and
- a pawl coupled to the link between the first and second ends and engaged with the ratchet.

7. The cutting tool of claim 6, wherein the follower is pivotably coupled to the second end of the link and engaged with the cam.

8. The cutting tool of claim 7, wherein the follower includes a roller engaged with the cam.

9. The cutting tool of claim 6, wherein the pawl is pivotably coupled to the link and movable between a first position, in which the pawl is engaged with the ratchet, and a second position, in which the pawl is disengaged from the ratchet.

10. The cutting tool of claim 6, wherein the pawl is a first pawl, and wherein the ratchet mechanism further includes a second pawl pivotably coupled to the housing and engaged with the ratchet.

11. The cutting tool of claim 10, further comprising an actuator engageable with the first and second pawls, and wherein the actuator is movable between a first, biased position in which the first and second pawls are permitted to engage the ratchet, and a second position in which the actuator disengages the first and second pawls from the ratchet.

12. The cutting tool of claim 11, wherein the ratchet mechanism further includes
- a lever coupled for co-rotation with the first pawl,
- a support shaft upon which the second pawl is coupled for co-rotation, and
- an arm coupled to the support shaft for co-rotation with the support shaft and the second pawl.

13. The cutting tool of claim 12, wherein the actuator includes
- a first cam lobe engageable with the lever when in the second position, and
- a second cam lobe engageable with the arm when in the second position.

14. The cutting tool of claim 11, further comprising
- a first trigger operable to activate the motor, and
- a second trigger operably coupled to the actuator for moving the actuator between the first and second positions.

15. The cutting tool of claim 14, wherein the second trigger is positioned proximate the first trigger such that an operator can grasp the first and second triggers with a single hand.

16. The cutting tool of claim 14, wherein the second trigger is pivotable between the first and second positions.

17. The cutting tool of claim 6, wherein the ratchet is rotatable in a first direction, against the bias of a spring, in response to actuation of the ratchet mechanism by the motor.

18. The cutting tool of claim 1, further comprising:
- an electronic braking circuit for normally providing a braking force to the motor in response to deactivation of the motor; and
- a current overload detection circuit for monitoring an amount of electrical current drawn by the motor when the motor is activated;
- wherein the current overload detection circuit both deactivates the motor and overrides the electronic braking circuit in response to the motor exceeding a threshold electrical current to prevent application of the braking force to the motor.

19. The cutting tool of claim 1, further comprising:
- a switch electrically connected with the motor and actuated between a first position in which the motor is activated and a second position in which the motor is deactivated;
- a current overload detection circuit for monitoring an amount of electrical current drawn by the motor when the motor is activated; and
- a reversing circuit for reversing a rotational direction of the motor in response to at least one of the motor exceeding a threshold electrical current and the switch being actuated from the first position to the second position.

20. The cutting tool of claim 1, further comprising a direction switch electrically connected with the motor and actuated between a first position in which the motor and the cam are driven in a forward direction, and a second position in which the motor and the cam are driven in a reverse direction.

* * * * *